(12) United States Patent
Song

(10) Patent No.: US 8,791,940 B2
(45) Date of Patent: Jul. 29, 2014

(54) APPARATUS AND METHOD FOR COMPENSATING FOR BLACK LEVEL

(75) Inventor: Dong Seob Song, Guri (KR)

(73) Assignee: SK Hynix Inc., Gyeonggi-do (KR)

(*) Notice: Subject to any disclaimer, the term of this patent is extended or adjusted under 35 U.S.C. 154(b) by 320 days.

(21) Appl. No.: 13/159,640

(22) Filed: Jun. 14, 2011

(65) Prior Publication Data

US 2012/0013599 A1    Jan. 19, 2012

(30) Foreign Application Priority Data

Jul. 14, 2010  (KR) ..................... 10-2010-0067967

(51) Int. Cl.
*G06F 3/038*  (2013.01)
*G09G 5/00*  (2006.01)
*H04N 5/361*  (2011.01)

(52) U.S. Cl.
CPC ....... *H04N 5/361* (2013.01); *G09G 2320/0626* (2013.01); *G09G 2320/0238* (2013.01)
USPC ......................................................... 345/214

(58) Field of Classification Search
CPC ..................................................... H04N 5/361
USPC ......................................................... 345/214
See application file for complete search history.

(56) References Cited

U.S. PATENT DOCUMENTS

| 7,719,551 B2* | 5/2010 | Aoki et al. ..................... 345/690 |
| 2005/0093991 A1* | 5/2005 | Yokohata et al. .......... 348/222.1 |
| 2007/0075772 A1* | 4/2007 | Kokubo et al. ............... 330/250 |
| 2011/0032998 A1 | 2/2011 | Park |

FOREIGN PATENT DOCUMENTS

| KR | 10-2007-0037286 A | 4/2007 |
| KR | 10-2009-0111635 A | 10/2009 |
| WO | WO 2009131358 A2 * | 10/2009 ............... H04N 5/16 |

* cited by examiner

*Primary Examiner* — Kwang-su Yang
(74) *Attorney, Agent, or Firm* — William Park & Associates Patent Ltd.

(57) ABSTRACT

An apparatus and method for compensating for a black level in order to solve a screen flickering phenomenon and a problem of convergence speed of a black level value. The apparatus for compensating for a black level includes: a black pixel average value extraction unit averaging black pixel values of a current frame to determine a black pixel average value; a luminance value extraction unit extracting a luminance value from an analog gain and concentration time information of an image sensor; a black level extraction unit calculating a frame weight by using the luminance value and acquiring a black level value of a current frame by using the frame weight, the black pixel average value, and a black level value of a previous frame; and a black level compensation unit compensating for valid pixel values of the current frame by using the black level value of the current frame.

7 Claims, 3 Drawing Sheets

APPARATUS AND METHOD FOR COMPENSATING FOR BLACK LEVEL

CROSS-REFERENCE TO RELATED APPLICATIONS

This application claims the priority of Korean Patent Application No. 10-2010-0067967 filed on Jul. 14, 2010, in the Korean Intellectual Property Office, the disclosure of which is incorporated herein by reference.

BACKGROUND OF THE INVENTION

1. Field of the Invention

The present invention relates to an apparatus for compensating for a black level of an image sensor.

2. Description of the Related Art

An image sensor, a semiconductor element for converting an optical image into an electrical signal, is widely employed for digital cameras, mobile communications terminals, and the like. The image sensor includes pixel arrays, and the like, which detect light generated from a subject and convert the detected light into an electrical value.

Recently, as an image sensor has been implemented to have a higher amount of pixels and a smaller size, pixel size has been reduced and a fabrication process has become finer, resulting in an increase in the influence of a dark current, dark current noise generated by the dark current, photon shot noise, MOS device noise, and the like. The increase in the dark current brings about problems such as the degradation of device performance and of charge storage capability. In particular, the increase in the dark current causes a serious problem such as degradation of the performance of the image sensor and of charge storage capability in a low intensity illumination environment.

Thus, in an effort to solve the problem of the dark current, currently, a black level value caused by the dark current is compensated for by using a black level compensation circuit.

In order to extract only a dark current value generated by heat, irrespective of an optical image, the black level compensation circuit extracts a black level value by using a pixel data value (namely, a black pixel value) of an optical black area completely blocked against light.

However, as the pixel size is reduced and the fabrication process becomes finer, dark current noise, photon shot noise, MOS device noise, and the like, are relatively increased as compared with a practical signal value. Thus, when the black level compensation circuit is in use, a variation of an inter-frame black level value is increased at a low intensity of illumination, causing a phenomenon in which a device screen flickers. In spite of an identical environment and an identical pixel, an output value of a pixel varies over time, due to the dark current noise, photon shot noise, MOS device noise, and the like, causing deviation between frames, and the inter-frame deviation is further increased at a low intensity of illumination in which a great deal of analog gains are used, to cause screen flicker.

That is, the difference between the pixels of frames causes a difference between black level values of the frames, and as a result, a black level value having a large deviation is subtracted from each frame in the same environment, causing the screen flickering phenomenon.

In order to reduce the screen flickering phenomenon, the number of pixels used to obtain a black level value may be increased to reduce the change in the black level value, which, however, inevitably increases the size of the image sensor, so this method is not practically desirable.

Another method of obtaining a black level value by using black pixel values during a few frames to tens of frames, rather than increasing the black pixels to obtain a black level, to reduce a change in the black level value to thereby minimize the screen flickering phenomenon has been proposed, but this method has a problem in that a convergence speed of the black level value is low.

Namely, the black level value sharply changes when an analog gain changes, but when an actually applied black level value is obtained by using black pixel values of a few frames to tens of frames as mentioned above, the black level value is gradually converged into a value fitting a current environment, causing a problem such as an AE (Auto-Exposure) speed, and the like.

SUMMARY OF THE INVENTION

An aspect of the present invention provides an apparatus and method for compensating for a black level capable of solving a problem of a convergence speed of a black level value as well as a screen flicking phenomenon by adaptively obtaining a weight of each frame by using the difference in luminance between frames and luminance information of a current frame, while using black pixel values of several frames without increasing the number of black pixels.

According to an aspect of the present invention, there is provided an apparatus for compensating for a black level, including: a black pixel average value extraction unit averaging black pixel values of a current frame to determine a black pixel average value; a luminance value extraction unit extracting a luminance value from an analog gain and concentration time information of an image sensor; a black level extraction unit calculating a frame weight by using the luminance value and acquiring a black level value of a current frame by using the frame weight, the black pixel average value, and a black level value of a previous frame; and a black level compensation unit compensating for valid pixel values of the current frame by using the black level value of the current frame.

According to another aspect of the present invention, there is provided a method for compensating for a black level, including: calculating a frame weight from an analog gain and concentration time information of an image sensor; extracting a black pixel average value from a black pixel value of a current frame provided by the image sensor; calculating a black level value of the current frame by using the frame weight, a black pixel average value of the current frame, and a black level value of a previous frame; and compensating valid pixel values of the current frame through the black level value of the current frame.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
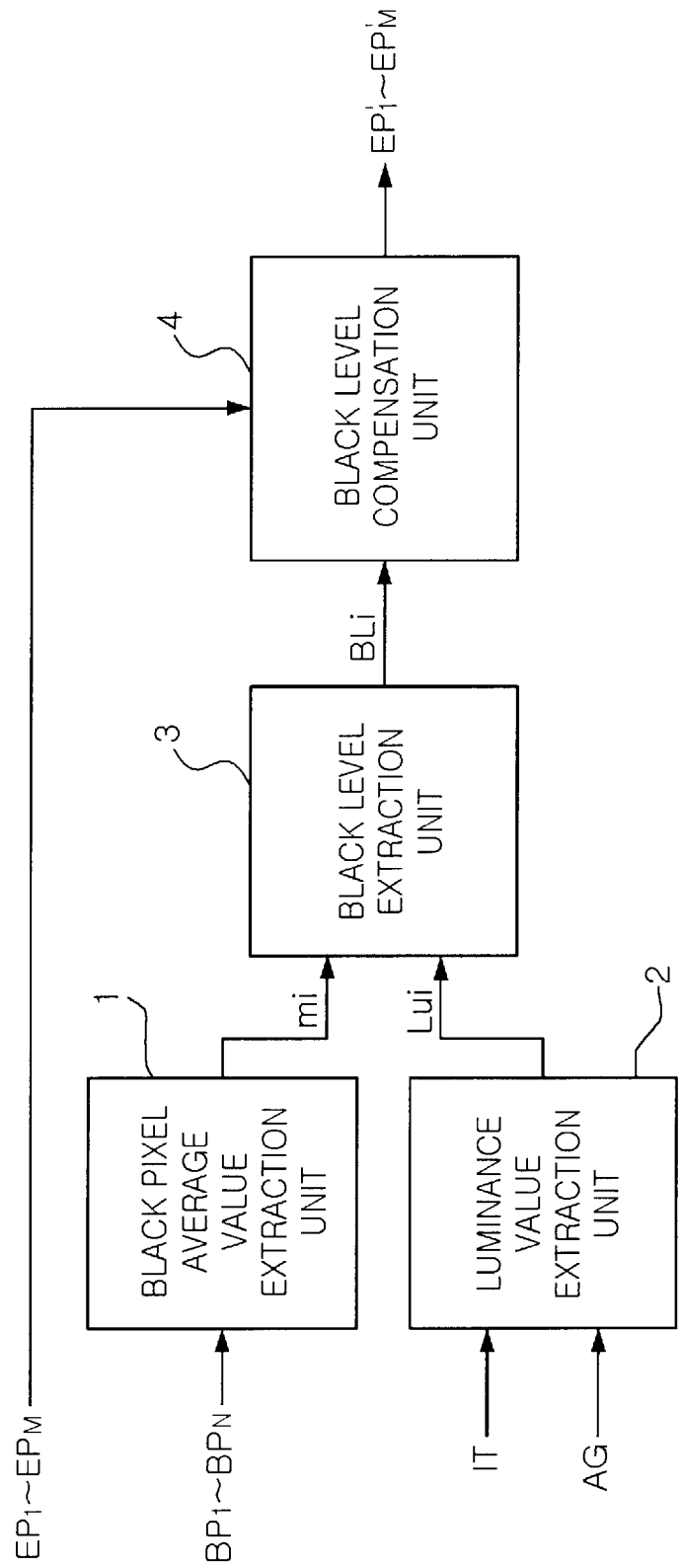
FIG. 1 is a schematic block diagram of an apparatus for compensating for a black level according to an exemplary embodiment of the present invention.

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

FIG. 1 is a schematic block diagram of an apparatus for compensating for a black level according to an exemplary embodiment of the present invention.

With reference to FIG. 1, the apparatus for compensating for a black level according to an exemplary embodiment of the present invention may include a black pixel average value extraction unit 1 operative to average black pixel values to extract a black pixel average value, a luminance value extraction unit 2 operative to extract a luminance value from an analog gain and concentration time information of an image sensor, a black level extraction unit 3, connected to the black pixel average value extraction unit 1 and to the luminance value extraction unit 2, operative to calculate a frame weight by using the luminance value and determine a black level value of a current frame by using the frame weight, the black pixel average value, and a black level value of a previous frame, and a black level compensation unit 4, connected to the black level extraction unit 3, operative to compensate for valid pixel values $EP_1 \sim EP_M$ of the current frame through the black level value of the current frame. The various units may be implemented in the various embodiments in various ways, such as, for example, using hard wired logic, or using one or more processors. The one or more processors may be, for example, a programmable processor having software and/or firmware executing thereon, ASICs, DSPs, etc. Therefore, the units may be implemented as hardwired logic, processors or combinations thereof in accordance with the embodiments. An apparatus as disclosed herein includes any processors, hardwired logic, etc., required to implement the various units as herein described.

In detail, the black pixel average value extraction unit 1 receives black pixel values $BP_1 \sim BP_N$ provided by N (N is a natural number) number of black pixels positioned at an optical black area, and averages them according to Equation 1 shown below to extract a black pixel average value $m_i$ of the current frame.

$$m_i = \frac{\sum_{j=1}^{N} BP_j}{N} \qquad \text{[Equation 1]}$$

In Equation 1, $BP_j$ is the jth black pixel value.

The luminance value extraction unit 2 multiplies an analog gain AG by concentration time information IT and divides a resultant value by a normalization factor $C_{nf}$ to determine the luminance value $Lu_i$ of the current frame, as represented by Equation 2 shown below:

$$Lu_i = \frac{AG \times IT}{C_{nf}} \qquad \text{[Equation 2]}$$

In Equation 2, $C_{nf}$ is a normalization factor, which is used to regulate a reflection degree of a frame normalization factor in a weight used to obtain a black level value by the black level compensation unit 4 later.

The black level extraction unit 3 calculates the black level value $BL_i$ to be applied to the current frame on the basis of the black pixel average value $m_i$ of the current frame determined by the black pixel average value extraction unit 1 and the luminance value $Lu_i$ of the current frame determined by the luminance value extraction unit 2.

Figure 2:
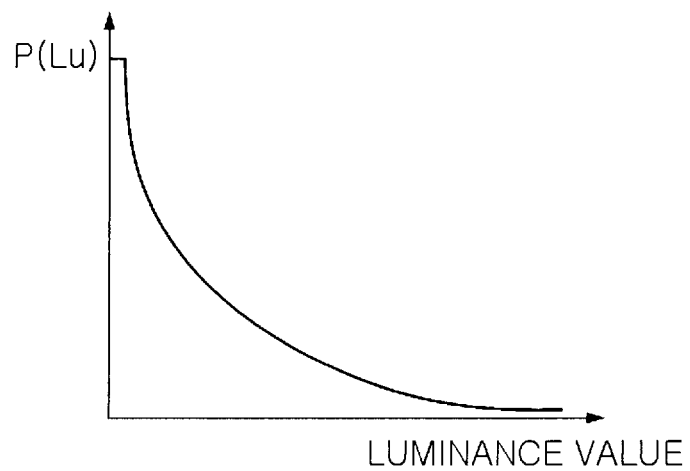
FIG. 2 is a graph showing a black level weight changing over a luminance value according to an exemplary embodiment of the present invention.
Figure 3:
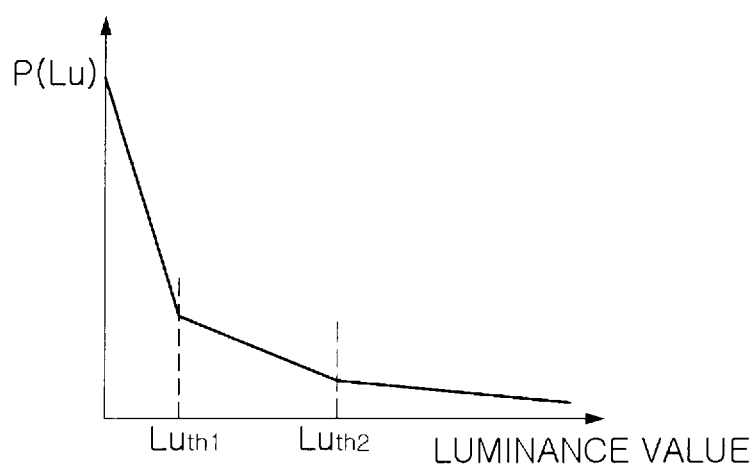
FIG. 3 is a graph showing a black level weight changing over a luminance value according to another exemplary embodiment of the present invention.

In detail, the black level extraction unit 3 adds an interframe luminance value $Lu_{diff}$ and a black level weight $P(Lu)$ according to a luminance value to determine a weight (w) to be used for obtaining the black level value $BL_i$ of the current frame. The black level weight $P(Lu)$ according to the luminance value has a form of a Poisson distribution function as shown in the graphs of FIGS. 2 and 3. The reason for this is because a noise distribution according to the luminance value appears substantially in the form of the Poisson distribution function as shown in FIGS. 2 and 3. FIG. 3 is a graph showing a similar form to that of FIG. 2 by dividing data sections by using a primary function in order to reduce complexity of the Poisson distribution function. The accuracy of P(Lu) does not greatly affect the overall performance, so the graph of FIG. 3 may be used in the place of the graph of FIG. 2.

$$w = Lu_{diff} + P(Lu)$$

$$Lu_{diff} = |Lu_i - Lu_{i-1}| \quad \text{[Equation 3]}$$

In Equation 3, $Lu_i$ is a luminance value of the current frame, and $Lu_{i-1}$ is a luminance value of a previous frame.

Figure 4:
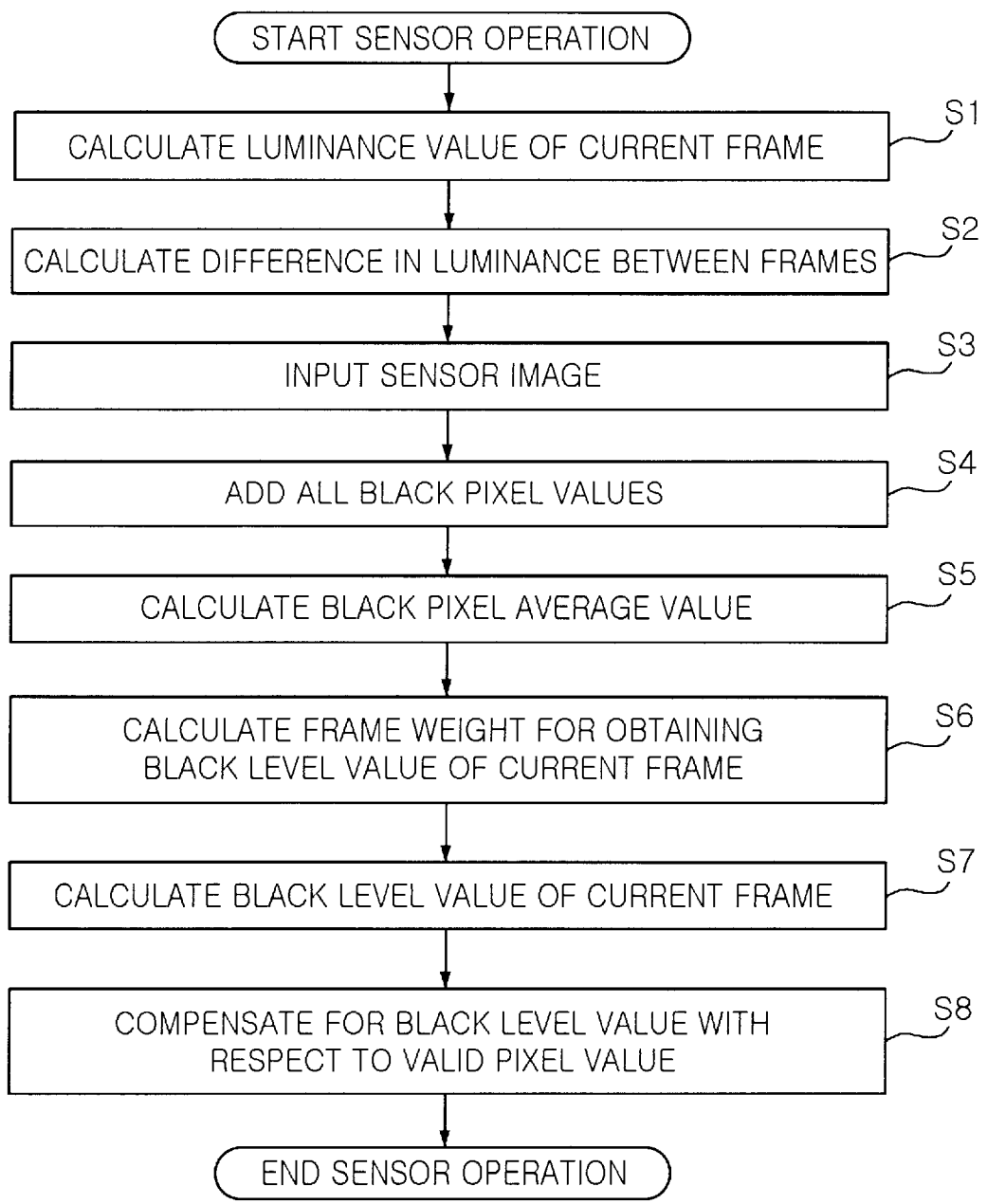
FIG. 4 is a flow chart illustrating the process of a method for compensating for a black level according to an exemplary embodiment of the present invention.

Thereafter, as shown in FIG. 4, the black level extraction unit 3 multiplies the difference between the black pixel average value $m_i$ of the current frame and the black level value $BL_{i-1}$ of the previous frame by the frame weight (w), and divides the resultant value by a control step resolution $R_w$ of the frame weight. The black level extraction unit 3 then adds the black level value $BL_{i-1}$ of the previous frame to a resultant value to finally determine a black level value BLi for compensating the valid pixel values $EP_1 \sim EP_M$ of the current frame.

$$BL_i = \frac{w(m_i - BL_{i-1})}{R_w} + BL_{i-1} \quad \text{[Equation 4]}$$

In Equation 4, $R_w$ is a factor for regulating the control step resolution of the frame weight, and a resolution setup of the frame weight has the characteristics that it increases in proportion to the factor $R_w$.

Finally, the black level compensation unit 4 serves to compensate for the valid pixel values $EP_1 \sim EP_M$ of the current frame by using the black level value $BL_i$ obtained by the black level extraction unit 3.

If it is processed only by a digital logic in the event of compensation, the black level compensation unit 4 may remove the black level of the current frame by simply subtracting the black level value $BL_i$ from the valid pixel values $EP_1 \sim EP_M$. However, when an analog circuit is used to reduce a loss of a dynamic range in the event of compensation, the black level compensation unit 4 may calculate an analog offset corresponding to the black level value BLi and feed back the calculated analog offset to the analog circuit, thus removing the black level of the current frame.

FIG. 4 is a flow chart illustrating the process of a method for compensating for a black level according to an exemplary embodiment of the present invention. Hereinafter, the case of processing by the digital logic will be described for the sake of brevity.

First, when the digital logic that controls the image sensor in operation provides the analog gain AG and the concentration time information IT of the image sensor, the black level compensation apparatus calculates the luminance value $Lu_i$ of the current frame by using the analog gain AG and the concentration time information IT (S1).

Next, the black level compensation apparatus compares the luminance value $Lu_{i-1}$ of the previous frame and the luminance value $Lu_i$ of the current frame to calculate the difference $Lu_{diff}$ in the luminance value between the frames (S2).

Subsequently, the black level compensation apparatus receives a sensor image (S3), adds up all of the black pixel values coming from an optical black area among the pixel values constituting the sensor image (S4), and divides the sum by the number of pixels of the optical black area, namely, by the number (N) of black pixels to obtain the black pixel average value $m_i$ of the current frame (S5).

Thereafter, the black level compensation apparatus calculates the frame weight (w) for obtaining the black level value $BL_i$ of the current frame by using the inter-frame luminance difference $Lu_{diff}$ and the black level weight P(Lu) according to the luminance value of the current frame (S6). The interframe luminance difference $Lu_{diff}$ may be obtained by comparing the luminance value of the current frame with the luminance value of the previous frame and determining the difference.

Subsequently, the black level compensation apparatus calculates the black level value $BL_i$ of the current frame by using the black pixel average value $m_i$ of the current frame calculated in step S5, the frame weight (w) calculated in step S6, the control step resolution $R_w$ of the frame weight, and the black level value of the previous frame according to Equation 4 (S7).

Finally, the black level compensation apparatus compensates for the black level values $EP_1 \sim EP_M$ of the valid pixels by using the black level value $BL_i$ of the current frame calculated in step S7 (S8).

For reference, in the above description, the respective steps are sequentially performed, but the steps may be performed in parallel or in reverse order, as necessary.

For example, steps S3 to S5 and steps S1, S2, and S6 may be performed in parallel, steps S3 to S5 may be performed first and steps S1, S2, and S6 may be performed thereafter, or steps S1, S2, and S6 may be performed first and steps S3 to S5 may be performed thereafter.

As set forth above, according to exemplary embodiments of the invention, because noise such as a dark current, photon shot noise, MOS device noise, and the like, assumes the form of random noise, black level values of several frames are averaged to be used based on the principle that as the number of black pixels used for obtaining a black level value increases, the variation of the black level value decreases, thus reducing a change in the black level value to minimize a screen flickering phenomenon.

A problem that the black level value is slowly converged because the black level values of several frames are averaged to be used can be minimized by adaptively obtaining a weight of each frame by using the difference in luminance between frames and the luminance information of the current frame (namely, the black level weight according to the luminance value).

In other words, in a situation in which the brightness of a surrounding environment, namely, the intensity of illumination changes rapidly, the black level value of the current is more weighted to increase the convergence speed, and when the intensity of illumination of the surrounding environment remains unchanged, because the convergence speed of the black level value does not affect an AE operation, the black level value of a previous frame is more weighted to minimize a screen flickering phenomenon, thus minimizing degradation of an AE speed.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for compensating for a black level, the apparatus comprising:
   a black pixel average value extraction unit, operative to determine a black pixel average value of a current frame by averaging black pixel values of the current frame;

a luminance value extraction unit, operative to extract a luminance value from an analog gain and concentration time information of an image sensor;

a black level extraction unit, connected to the black pixel average value extraction unit and the luminance value extraction unit, operative to calculate a frame weight by using the luminance value and determine a black level value of the current frame by using the frame weight, the black pixel average value, and a black level value of a previous frame; and a black level compensation unit, connected to the black level extraction unit, operative to compensate for valid pixel values of the current frame by using the black level value of the current frame, wherein the luminance value extraction unit is operative to determine the luminance value by multiplying the analog gain by the concentration time information to obtain a resultant value, and dividing the resultant value by a normalization factor.

2. The apparatus of claim 1, wherein the black level extraction unit is operative to determine the black level value of the current frame from an equation:

$$BL_i = \frac{w(m_i - BL_{i-1})}{R_w} + BL_{i-1}$$

wherein $BL_i$ is the black level value of the current frame, w is a frame weight, $m_i$ is the black pixel average value of the current frame, $BL_{i-1}$ is the black level value of the previous frame, and $R_W$ is control step resolution of the frame weight, where i is a positive integer.

3. The apparatus of claim 2, wherein the black level extraction unit is operative to determine the frame weight by using a difference in luminance between the current and previous frames and a luminance value of the current frame.

4. The apparatus of claim 1, wherein the black level compensation unit is operative to subtract the black level value of the current frame from each of the valid pixel values.

5. The apparatus of claim 1, wherein the black level compensation unit is operative to calculate an analog offset corresponding to the black level value of the current frame and feedback the analog offset to an analog circuit to remove the black level of the current frame.

6. A method for compensating for a black level, the method comprising:

calculating a frame weight from an analog gain and concentration time information of an image sensor;

extracting a black pixel average value from a black pixel value of a current frame provided by the image sensor;

calculating a black level value of the current frame by using the frame weight, a black pixel average value of the current frame, and a black level value of a previous frame; and compensating for valid pixel values of the current frame by using the black level value of the current frame, wherein said calculating the frame weight comprises:

determining a luminance value of the current frame by using the analog gain and the concentration time information;

determining a difference in luminance between frames by comparing the luminance value of the current frame to a luminance value of the previous frame; and determining the frame weight by using the difference in luminance between the frames and the luminance value of the current frame.

7. The method of claim 6, wherein said calculating the black level value of the current frame, uses an equation:

$$BL_i = \frac{w(m_i - BL_{i-1})}{R_w} + BL_{i-1}$$

wherein $BL_i$ is the black level value of the current frame, w is a frame weight, $m_i$ is the black pixel average value of the current frame, $BL_{i-1}$ is the black level value of the previous frame, and $R_W$ is control step resolution of the frame weight, where i is a positive integer.

* * * * *